United States Patent
Katsuda et al.

[11] Patent Number: 6,129,381
[45] Date of Patent: *Oct. 10, 2000

[54] GAS GENERATOR FOR AIR BAG AND AIR BAG SYSTEM

[75] Inventors: Nobuyuki Katsuda; Shogo Tomiyama, both of Himeji, Japan

[73] Assignee: Daicel Chemical Industries, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/960,623

[22] Filed: Oct. 29, 1997

[30] Foreign Application Priority Data

Aug. 12, 1997 [JP] Japan ................................ 9-217843

[51] Int. Cl.[7] .................................................. B60R 21/26
[52] U.S. Cl. ........................................ 280/741; 102/531
[58] Field of Search .................................. 280/741, 736, 280/740, 742; 102/530, 531

[56] References Cited

U.S. PATENT DOCUMENTS 5,031,932  7/1991  Frantom et al. .
5,217,697  6/1993  Kanazawa et al. ..................... 280/741
5,306,041  4/1994  Ogawa et al. .......................... 280/741
5,387,007  2/1995  Ogawa et al. .
5,458,371  10/1995 Fulmer et al. .
5,773,754  6/1998  Yamato ................................... 280/741

FOREIGN PATENT DOCUMENTS 9425315A  11/1994  WIPO .

*Primary Examiner*—Peter C. English

[57] ABSTRACT

An air bag gas generator has a cylindrical member that permits reliable welding of the cylindrical member with an inner surface of a ceiling portion of a housing even if the welding surface is slightly misaligned. It furthermore permits welding in such a manner (a more stable manner) that unsteadiness does not occur in the area where the inner surface of the ceiling portion of the housing and the inner cylindrical member abuts. In the air bag gas generator, which includes the inner cylindrical member in the housing, the inner cylindrical member has a broad width portion, extending inwardly or outwardly at one end where it joins the inner surface of the ceiling portion.

15 Claims, 4 Drawing Sheets

GAS GENERATOR FOR AIR BAG AND AIR BAG SYSTEM

FIELD OF THE INVENTION

This invention is directed to an air bag gas generator for protecting a passenger from impacts, in particular to an air bag gas generator having a characteristic inner cylindrical member structure contained in a housing.

DESCRIPTION OF THE RELATED ART

A conventional air bag gas generator is constructed by forming a housing, having gas discharge ports, by casting, forging, or press work, etc., and providing, inside the housing, an igniting unit, gas generating agents, and a filter unit. Each of these is provided in the housing as is, or the inside of the housing is partitioned by an inner cylindrical member into two or more chambers. Each of the above-mentioned units, respectively, is provided in each of these partitioned chambers, as needed, according to their function.

When the inside of the housing is partitioned by the inner cylindrical member into two or more chambers, the cylindrical member is incorporated into the inner surface of the housing. Specifically, when the housing is formed by casting, the cylindrical member is incorporated into the housing in advance. When forming only the housing by press work, etc., a cylindrical-shaped inner cylindrical member, which is formed separately, is welded onto the inner surface of the ceiling of the housing.

However, when a separately formed inner cylindrical member is attached by welding, etc., to the ceiling portion of the inner surface of the housing, after the housing is formed, these two are welded from an outer surface of the housing. This makes determining the welding point difficult. Especially, when the inner cylindrical member is formed by pressing using a stainless steel sheet, etc., the circumferential wall of the cylindrical member is thin. This makes it more difficult to determine the welding point. If the point where the inner cylindrical member contacts the inner surface of the ceiling portion of the housing and the welding point from the outer surface of the housing are not accurately aligned, even slightly, the two members cannot be reliably attached. Furthermore, if holes are created in both members by welding, while the contact point and welding point are not accurately aligned, neither of these members can be used.

When the inner cylindrical member is joined to the inner surface of the ceiling portion of the housing afterwards, the inner surface of the ceiling portion of the housing ceiling is usually placed on the end surface of the inner cylindrical member and then fixed and secured to a jig. This led to the possibility of unstableness or misalignment (tilting) due to the small contact surface.

SUMMARY OF THE INVENTION

Therefore, the present invention resolves the above-mentioned problems by providing an air bag gas generator, in which an inner cylindrical member is welded to the ceiling portion of the inner surface of the housing after only the housing is formed, where the inner cylindrical member can be reliably welded to the inner surface of the ceiling portion of the housing even if the welding point is slightly misaligned, and a gas generator having a cylindrical member, which can be welded to a ceiling portion of the inner surface of the housing without causing any instability (a more stable manner) in the area where the cylindrical member abuts the ceiling portion.

The air bag gas generator of the present invention is characterized, in particular, by the shape of the inner cylindrical member contained in the housing. It is further characterized that a broad width area is formed at an end portion of the inner cylindrical member for joining the ceiling of the inner surface.

In other words, the air bag gas generator of the present invention, which is constituted by partitioning the inside of the housing by the inner cylindrical member into two or more chambers, is characterized by the inner cylindrical member having the broad width area, extending inward or outward, at the end portion that joins the inner surface of the ceiling.

The inner cylindrical member can be formed by either casting, forging, or press or cutting work, etc., or a combination of these. When it is formed by press work, it can be formed, for example, by: the UO press method (the sheet is molded into a U shape, then molded into an 0 shape, and the seam is then welded); the electrical seam tube method (the sheet is molded into a disc shape, and the seam is welded with resistance heat by running a large electrical current while adding pressure to the seam.), etc. When it is formed by cutting work, a stainless steel rod can be cut into a desired size. The broad width portion formed at its end portion is extended to the degree needed to function as the welding area when the inner cylindrical member is welded onto the ceiling of the inner surface of the housing. As a result, the above-mentioned inner cylindrical member and the inner surface of the ceiling of the housing can be reliably joined via the broad width portion. This broad width portion can be, for instance, a flange formed by bending the end portion of the inner cylindrical member, which joins the inner surface of the ceiling of the housing to the outside or inside. The above-mentioned housing can be formed by casting, forging, press work, etc., and it is preferably formed by welding a diffuser shell having gas discharge ports and a closure shell having an igniting unit storage opening. The two shells can be joined by various welding methods, such as electron-beam welding, laser welding, TIG welding, projection welding, etc. When the housing is formed by welding the diffuser shell and closure shell together, the cylindrical member is welded and incorporated into the inner surface of the circular area of the diffuser shell. The cylindrical member and the diffuser shell can be welded using various welding methods, as in the joining of the above-mentioned two shells. When the diffuser shell and closure shell are formed by press-molding a sheet steel, such as stainless steel sheets, etc., the manufacture of the two shells becomes easy and a reduction in manufacturing cost is achieved. Also, by forming the two shells into simple, cylindrical shapes, the press-molding becomes easy. As for the material for the diffuser shell and closure shell, stainless steel sheet is desirable, but nickel-plated sheet steel may be used.

In the gas generator of the present invention, the inner cylindrical member having the broad width portion is contained in the housing. Aside from this, it has structures and members required for its operation, and structures and members, which are effective for the operation of a gas generator, may also be used as needed. For the structures and members required for operating this gas generator, there are, for instance: an igniting unit, which is activated upon sensing an impact via a mechanical or electrical mechanism; gas generating agents, which are ignited by the activation of the igniting unit and burn and generate combustion gas; a filter unit, which purifies and cools the combustion gas generated; etc. On the other hand, for structures and members that are advantageous for the operation of the gas generator, there are, for instance: a filter support member, which is provided between an inner cylindrical member that partitions to form an igniting unit storage chamber on its inner side and the filter unit, and that which supports the filter unit; a short-pass preventing unit (plate member, etc.), which encloses the top end and/or bottom end of the inner circumference of the filter unit and which prevents the generated gas to pass through a gap between the filter unit and the inner surface of the housing; a cushion member, which is provided above and/or below the gas generating agents to prohibit the gas generating agents from moving; a perforated basket, which has multiple holes, is cylindrical in shape, and it prevents the gas generating agents installed inside of the filter means from directly contacting the filter unit. It also protects the filter unit from the flames from the combustion of the gas generating agents; a space, which is provided between the outer surface of the filter unit and the side wall inner surface of the housing and which functions as a gas channel, etc.

As the method for sensing an impact and method for activating the igniting unit, the air bag gas generator of the present invention can use either a mechanical ignition type, which is activated by sensing an impact exclusively by means of a mechanical method, or an electrical ignition type, which is activated by an electrical signal transmitted from an impact sensor, as long as it uses the inner cylindrical member with the above-mentioned structure.

The mechanical ignition type igniting unit comprises: a mechanical sensor, which senses an impact via an exclusively mechanical method, such as the firing of a firing pin via the movement of a weight, etc.; a detonator, which is ignited when struck by the firing pin fired from the mechanical type sensor and then burns; and a transfer charge, which is ignited by the flame from the detonator and then burns. On the other hand, the electrical ignition type igniting unit comprises: an electrical sensor, which senses an impact exclusively by means of an electrical mechanism; an igniter, which is activated by an electrical signal transmitted from an impact sensor; and a transfer charge, which is ignited by the activation of the igniter and then burns. For the electrical sensor, there are, for instance, a semiconductor type acceleration sensor, etc. This semiconductor-type acceleration sensor has four semiconductor strain gauges formed on a beam of a silicon substrate, which is designed to be deflected when acceleration occurs. These semiconductor strain gauges are bridge connected. When acceleration occurs, the beam is deflected, and the surface is strained. Because of this strain, the resistance of the semiconductor strain gauges changes, and this resistance change is detected as a voltage signal that is proportional to the acceleration. In the electrical ignition type igniting unit, in particular, a control unit with an ignition evaluation circuit may be included. The signal from the above-mentioned semiconductor-type acceleration sensor is inputted in the ignition evaluation circuit; the control unit begins its calculation at the point at which the impact signal exceeds a certain value; and outputs the activation signal to the gas generator when the calculation result exceeds a certain value.

As the above-mentioned gas generating agents, agents based on inorganic azide, which are widely known in the art, in particular a sodium azide, for instance, an equivalent mixture of soda azide and copper oxide, or a non-azide gas generating agent can be used. Various nonazide gas generating agent compositions have been proposed. For example, known compositions are ones primarily composed of an organic compound containing nitrogen, such as tetrazole, triazole, or the metal salts of these, etc., and an oxidizing agent containing oxygen, such as alkali metal nitrate, etc., and compositions using as their fuel and nitrogen source triaminoguanidine nitrate, carbohydrazide, nitroguanizine, etc., and using as their oxidizing agent the nitrate, chlorate, perchlorate, etc., of an alkali metal or alkali earth metal. Any one of these, but certainly not limited to these, may be used as the gas generating agents in this invention, and they are selected as needed according to the burning rate, combustion rate, non-toxicity, and combustion temperature requirements. The gas generating agents are used in the appropriate form such as a pellet, a wafer, a hollow cylinder, multiple holes, a disc, etc.

The filter unit, which is accommodated and installed in the housing, is cylindrical in shape. It functions to remove combustion residues produced by the combustion of the gas generating agents and also to cool the combustion gas. As a filter means, form example, a filter conventionally used for purifying the gas generated in the housing and/or a coolant used for cooling the generated gas are used. Aside from these, a multi-layered wire mesh filter, etc., which has been formed by compression-molding a ring-shaped multi-layered wire mesh, composed of the appropriate material, may also be used. More specifically, the multi-layered wire mesh filter can be formed: by shaping a plain stitch stainless steel wire mesh into a cylindrical body, forming a ring-shaped multi-layered body by repeatedly bending one end of the cylindrical body outward, and compression-molding the multi-layered body in a mold; or shaping plain stitch stainless steel wire mesh into a cylindrical body, forming this into a sheet by pressing this cylindrical body in a radial direction, forming a multi-layered body by multi-rolling this sheet body into a cylindrical shape, and compression-molding this multi-layered body in a mold, etc. The material used for the wire mesh may be stainless steel, such as SUS304, SUS310S, SUS316 (JIS standard code), etc. SUS304 (18Cr—8Ni—0.06C) stainless steel exhibits excellent corrosion resistance as does austenitic stainless steel.

The filter unit can also be of a dual structure having inner or outer layer made of a multi-layered wire mesh body. The inner layer may have a filter unit protection function to protect the filter unit against the flame from the igniting unit bursting toward the filter unit, and protect the filter unit against the high-temperature combustion gas or flame of the gas generating agents being ignited by the flame and burning. When the filter unit expands due to the gas pressure when the gas generator is in operation, the outer layer may function as means for preventing expansion of the filter in order to prevent a plenum created between the filter unit and the outer circumferential wall of the housing from being blocked. Incidentally, the expansion of the filter unit can be prohibited by supporting the outer circumference of the filter unit with an outer layer composed of a multi-layered wire mesh body, a perforated cylindrical body, a round belt body, etc.

The above-mentioned air bag gas generator is placed inside a module case along with an air bag that is inflated by introducing the gas generated by the gas generator to constitute an air bag system.

In this air bag system, coupled with the impact sensor sensing an impact, the gas generator is activated and the combustion gas is discharged from the gas discharge ports in the housing. This combustion gas is ejected into the air bag, and because of this, the air bag ruptures the module cover and inflates. The air bag creates a cushion for absorbing the impact between hard structures and a passenger inside a vehicle.

The gas generator of the present invention is formed using an inner cylindrical member with the above mentioned broad width portion; thus, it is possible to assimilate a welding point/beam misalignment. Moreover, the inner cylindrical member can be completely secured without creating any gap or tilt at the contact area with the bottom surface portion of the diffuser, resulting in a gas generator for an air bag in which the inner surface of the ceiling portion of the housing is reliably attached with the end portion of the inner cylindrical member.

DETAILED DESCRIPTION OF THE PREFERRED EMBODIMENTS

Preferred embodiments of the present invention will be described in the following with reference to the drawings.

Figure 1:
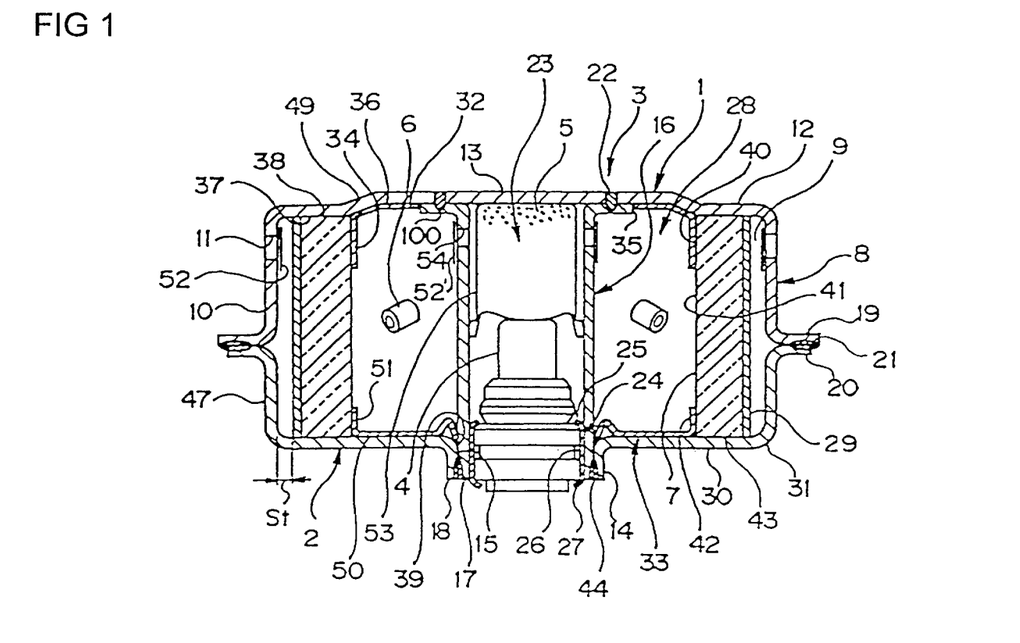
FIG. 1 is a vertical cross-sectional view of one embodiment of the gas generator of the present invention.

FIG. 1 is a cross-sectional view of an air bag gas generator of the present invention. This embodiment is effective as a gas generator primarily with a housing having an outer diameter of about 70 mm. This gas generator includes: a housing 3, which is composed of a diffuser shell 1 and a closure shell 2; an electrical ignition type igniting unit provided in a storage space in the housing 3, i.e., an igniter 4 and a transfer charge 5; gas generating agents, which are ignited by the igniter 4 and the transfer charge 5 and generate combustion gas, i.e., solid gas generating agents 6; and a filter unit which defines a combustion chamber 28 so that the gas generating agents 6 may be contained, i.e., a coolant/filter 7.

Figure 2:
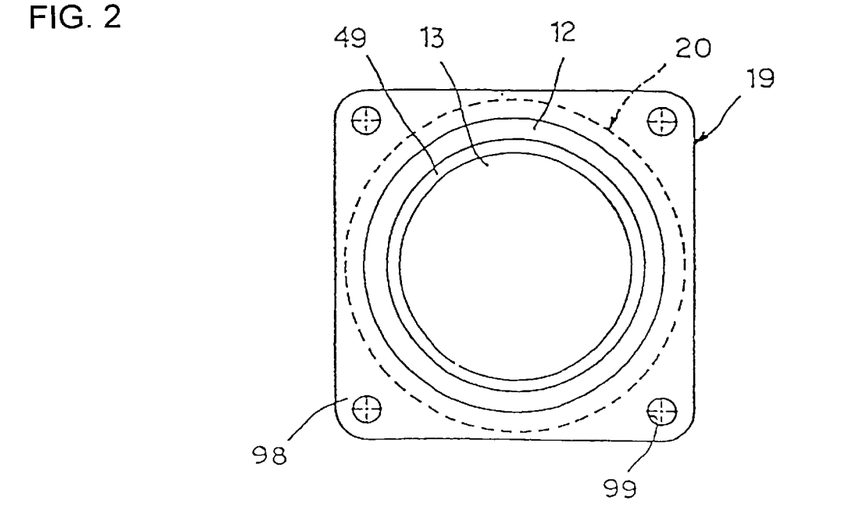
FIG. 2 is a plan view of the same gas generator.

The diffuser shell 1 is formed by pressing a stainless steel sheet. It has a circular portion 12 and a circumferential wall portion 10 formed on the outer circumferential portion of the circular portion 12. It also has a flange portion 19, which is located at the tip of this circumferential wall portion 10 and extends outward in the radial direction. In the present embodiment, the circumferential wall portion 10 is provided with eighteen 3 mm diameter gas discharge ports 11 at equal intervals in the circumferential direction. A protruding circular portion 13, which protrudes outward due to a reinforced step 49, is formed at the center of the circular portion 12 of the diffuser shell 1. The reinforced step 49 functions to provide stability to the housing, especially to the diffuser shell circular portion 12 that forms its ceiling portion. The step 49 also increases the capacity of the storage space. A transfer charge container 53, which contains a transfer charge 5, is held between the protruding circular portion 13 and the igniter 4. The flange portion 19 of the diffuser shell, shown in FIG. 2, has an attachment portion 98 for attaching metal fittings of a pad module. This attachment portion 98 is provided at a 90-degree interval in the circumferential direction of the flange portion 19, and it has attachment holes 99 for receiving screws. An outer edge of the flange portion 20 on a closure shell side is indicated by the dotted line in FIG. 2.

The closure shell 2 is formed by pressing a stainless steel sheet. It has a circular portion 30, a central opening 15 formed at its center, a circumferential wall portion 47 formed on the outer circumferential portion of above-mentioned circular portion 30, and a flange portion 20, which is located at the tip of this circumferential wall portion 47 and which extends outward in the radial direction. A bent portion 14, bent in the axial direction, is provided at an edge of the central opening 15. The bent portion 14 provides rigidity to the edge of central opening 15 and provides a relatively large joint face with the inner cylindrical member 16. The inner cylindrical member 16 is provided so as to fit into the central opening 15, and an end surface 17 of one end of the inner cylindrical member 16 is designed to become level with the end surface 18 of the bent area 14.

The diffuser shell 1 and the closure shell 2 form the housing 3 by overlaying the flange portion 19 of the diffuser shell with the flange portion 20 of the closure shell at the central cross-section in the horizontal direction with respect to the axial direction of the housing 3. These shells are connected by laser welding 21. The flange portions 19 and 20 provide rigidity to the housing, especially to its outer circumferential wall 8, to prevent deformation of the housing due to gas pressure.

The inner cylindrical member 16 is made of a stainless steel tube, one end of which is joined to the protruding circular portion 13 of the diffuser shell 1, at a broad width portion 100 extending outside thereof, and the other end of which is open. The broad width portion 100 is secured to the protruding circular portion 13 of the diffuser shell by electron-beam 22 welding from outside of the diffuser shell. The igniting unit storage chamber 23 is formed inside the inner cylindrical member 16. The interior of the igniting unit storage chamber 23 is provided with an igniter 4, which is activated by a signal from a sensor (not shown in the Figure), and the transfer charge container 53, which contains the transfer charge 5 to be ignited by this igniter 4. In this embodiment, the inner cylindrical member 16 has an igniter holding member 24, and the holding member 24 comprises: a flange area 25, which faces inward to restrict the axial movement of the igniter 4, a circumferential wall portion 26, where the igniter is fitted and secured on the inner circumferential surface of inner cylindrical member 16; and a crimping portion 27, which secures the igniter axially by crimping the above-mentioned inward facing flange portion 25. The inner cylindrical member 16 also has through-holes 54 on one side thereof (i.e., the diffuser shell side). In this embodiment, six 2.5-mm diameter through-holes are provided at equal intervals in the circumferential direction, and the through-holes 54 are sealed by a seal tape 52'.

The inner cylindrical member 16 is formed by rolling and welding a 1.2–3.0 mm thick stainless steel sheet into a tube body, and a broad width portion 100 is formed at one end thereof. The cylindrical member may have an outer diameter of 17–22 mm, and the broad width portion 100 has an outer diameter greater than 22 mm and less than 47 mm, preferably an outer diameter greater than 30 mm and less than 47 mm. This kind of welded tube can also be obtained by forming a cylindrical shape using, for instance: the UO press method (molding the sheet into a U shape, then shaping it into an O shape, and welding the seam); the electrical seam tube method (molding the sheet into a disc shape, and welding the seam with resistance heat by running a large electrical current while adding pressure to the seam); etc, and forming the above-mentioned broad width portion 100. Incidentally, aside from the above, the inner cylindrical member 16 can be formed by either casting, forging, or press or cutting work, etc., or a combination of the above.

A coolant/filter 7 is provided, surrounding the gas generating agents 6, and defines a ring-shaped chamber, i.e., the combustion chamber 28 around the inner cylindrical member 16. The coolant/filter 7 is formed by overlaying a plain stitched stainless steel wire mesh in the radial direction and compressing it in the radial and axial directions. The coolant/filter 7 has a shape, in each layer, in which loop-like stitches have been mashed down. Each layer is overlayed in the radial direction. Therefore, the spacing structure of the coolant/filter is complex so that the coolant/filter has an excellent residue collection effect. In order to prevent the plenum 9 from being blocked due to the expansion of the coolant/filter 7 by the gas pressure when the gas generator is in operation, an outer layer 29, which functions as the inhibiting unit to restrict the expansion of the coolant/filter, is formed on the outer side of the coolant/filter 7. The outer layer 29 can be formed, for instance, using a multi-layered wire mesh body, using a multi-hole cylindrical member having through-holes on the circumferential wall surface, or using a belt-shaped inhibiting layer in which a belt member with a desired width is made into a round shape. When the outer layer 29 is formed using the multi-layer wire mesh body, the outer layer 29 can also have a cooling function. The combustion chamber 28 is defined by the coolant/filter 7. The combustion gas generated in the combustion chamber is cooled, and the combustion residue is collected.

A tilted area 31 is formed in the circumferential direction, enclosing circular portion 30 of the closure shell. The tilted portion 31 prohibits the movement of the coolant/filter 7. It also creates a plenum between the outer circumferential wall 8 of the housing and the coolant/filter 7.

A plurality of solid gas generating agents 6 are provided in the combustion chamber 28. The gas generating agent 6 is a hollow cylinder in shape, and because of this shape, combustion occurs at the outer and inner surfaces. This is advantageous in that, as the combustion progresses, the surface area of the entire gas generating agent changes very little.

A plate member 32 is provided at the upper end of the coolant/filter 7, and a plate member 33 is provided at the lower end thereof. The plate member 32 comprises a circular portion 36, which closes off an opening 40 at the upper end of the coolant/filter 7, and the circumferential wall portion 34, which is integrated with the circular portion 36, directly contacting the inner circumferential surface 41 of the coolant/filter. The circular portion 36 has a central opening 35 that engages with the outer circumference of the above-mentioned inner cylindrical member 16. The circumferential wall portion 34 opposes through-holes 54 for ejecting flames from the igniting unit flame, and it covers the inner surface 41 of the coolant/filter close to the through-holes 54. The circumferential wall area 34 functions to protect the coolant/filter from the flame bursting toward the coolant/filter 7, and also to change the direction of the flame and such that the flame spreads sufficiently toward the gas generating agents 6.

The plate member 32 is secured to inner cylindrical member 16 with respect to its radial movement. It positions the coolant/filter 7 when the gas generator is assembled. It also functions as a short-pass prevention unit that prevents the so-called short-passing of the combustion gas. That is, the combustion gas does not pass through the coolant/filter but passes through a gap created between the inner surface 37 of the housing and the end surface 38 of the coolant/filter due to the pressure of the combustion gas when the gas generator is in operated. In the embodiment shown in FIG. 1, the plate member 32 is secured by having the central opening 35, which is formed in its circular area 36, fitted in the outer circumference of the broad width area 100 of the inner cylindrical member 16.

The plate member 33 comprises a circular area 50, which closes the opening 42 at the bottom end of the coolant/filter 7, and a circumferential wall portion 51, which is integrated with the circular area 50 and directly contacts the inner circumferential surface 41 of the coolant/filter. The circular area 50 has a central opening 39, which fits in the outer circumference of the inner cylindrical member 16, and directly contacts the gas generating agents to prohibit the movement of the gas generating agents. The plate member 33 is held between the inner cylindrical member 16 and the coolant/filter 7 by an elastic force, and prevents the combustion gas from short-passing at the above-mentioned end surface 38 and the opposite end surface 43 of the coolant/filter. It also functions as a welding protection plate at the time of welding.

The plenum 9 is formed between the outer circumferential wall 8 of the housing and the outer layer 29 of the coolant/filter. The plenum 9 forms, around the coolant/filter 7, a gas channel whose cross-section in the radial direction is ring-shaped. It is desirable for the area St at the radial direction cross-section of the gas channel to be made greater than the total sum of the opening area of each gas discharge port 11 in the diffuser shell. In this embodiment, the area of the radial direction cross-section of the gas channel is constant, but it is possible to increase the area of the radial direction cross-section of the gas channel as it gets closer to gas discharge ports 11, for instance, by forming the coolant/filter into a conical shape. In this case, a mean value may be used as the area of the radial direction cross-section of the gas channel. Due to the existence of the gas channel around the coolant/filter, the combustion gas passes through the entire region of the coolant/filter and moves toward the gas channel. Because of this, effective use of the coolant/filter and effective cooling and purifying of the combustion gas are achieved. The combustion gas, which has been cooled and purified, passes through the above-mentioned gas channel and reaches the gas discharge ports 11 in the diffuser shell.

In the present embodiment, a plenum between the outer circumferential wall of the housing and the coolant/filter was provided. However, the plenum may not be necessary.

In order to prevent outside moisture from entering the housing 3, the gas discharge ports 11 in the diffuser shell are sealed with an aluminum tape 52.

When assembling the gas generator, the diffuser shell 1, to which the inner cylindrical member 16 has been joined by welding the broad width area 100, is placed with its protruding circular area 13 at the bottom. The plate member 32 is placed onto the inner cylyndrical member 16. member 32. The coolant/filter 7 is fitted outside of the circumferential wall portion of the plate member 32, and with this, the coolant/filter 7 is positioned. On the inner side of the coolant/filter 7, solid gas generating agents 6 are provided. Then, the plate member 33 is further provided on top of this. Next, the central opening 15 of the closure shell is placed onto the inner cylindrical member 16 such that the inner cylindrical member 16 is inserted into the central opening 15 of the closure shell. The flange area 20 of the closure shell is laid over the flange area 19 of the diffuser shell. Laser welding 21 and 44 are provided to join the diffuser shell 1 with the closure shell 2, and the closure shell 2 with the inner cylindrical member 16, respectively. Finally, the transfer charge container 53 and the igniter 4 are inserted into the inner cylindrical member 16, and then these are secured by crimping the crimping area 27 of the igniter holding member.

In the gas generator having this structure, when the sensor (not shown in the Figure) senses an impact, its signal is sent to the igniter 4 to activate the igniter 4. Because of this, the transfer charge 5 inside the transfer charge container 53 is ignited and produces a high temperature flame. This flame bursts from the through-holes 54 and ignites the gas generating agents 6 near the through-holes 54. It also ignites the gas generating agents at the lower area of the combustion chamber, with its course being changed by the circumferential wall portion 34. Due to this, the gas generating agents burn and produce a high-temperature/high pressure gas; this combustion gas passes through the entire region of the coolant/filter 7, during which period it is effectively cooled or its combustion residue collected. The combustion gas, which has been cooled and purified, passes through the gas channel (plenum 9), ruptures the wall of the aluminum tape 52, ejects from the gas discharge ports 11, and flows into the air bag (not shown in the Figure). Because of this, the air bag inflates and forms a cushion between a passenger and hard structures, protecting the passenger from an impact. The above-mentioned step 49 of the diffuser shell circular portion and the above-mentioned bent portion 14 of the closure shell circular area provide rigidity to the ceiling and bottom areas of the housing in order to prevent deformation of the housing due to the gas pressure. Also, the flange portions 19 and 20, which overlap and join at the central cross-section in the axial direction of the housing, provide rigidity to the outer circumferential wall 8 of the housing in order to prevent deformation of the housing due to the gas pressure. Moreover, when a gap is created at the end surface of the coolant/filter, short-passing of the combustion gas is prevented by the above-mentioned plate members 32 and 33.

Figure 3:
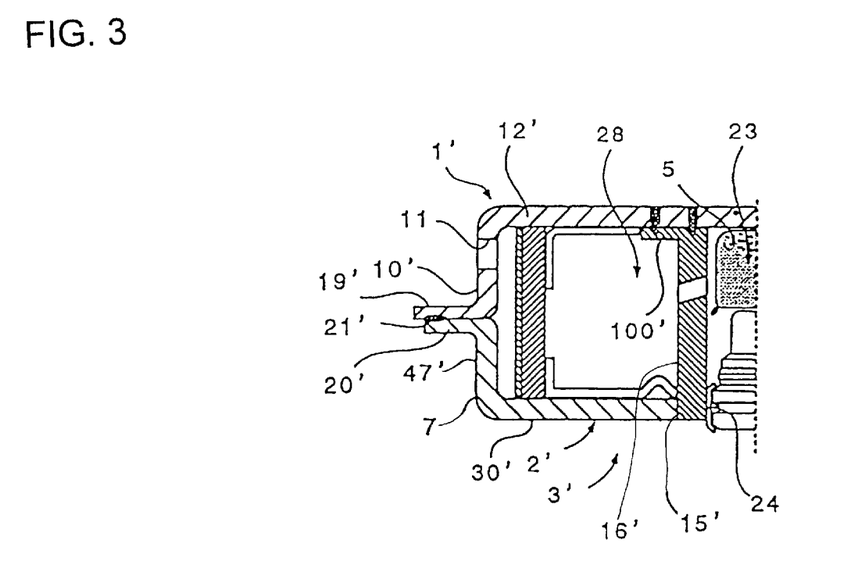
FIG. 3 is a vertical cross-sectional view of another embodiment of the gas generator of the present invention.

The gas generator, as shown in FIG. 3, is similar to the one shown in FIG. 1, and FIG. 3 shows an embodiment in which a diffuser shell 1' and a closure shell 2' are formed by casting, using aluminum alloy. The diffuser shell 1' has: a circular portion 12'; a circumferential wall portion 10' formed on the outer circumferential portion of the circular area 12'; and a flange portion 19', which is located at its tip and extending outward radially. The closure shell 2' has: a circular portion 30'; a central opening 15' formed at its center; a circumferential wall portion 47' formed on the outer circumferential portion of the above-mentioned circular portion 30'; and a flange portion 20', which is located at the tip of this circumferential wall portion 47' and extends outward in the radial direction. Also in this embodiment, the central cylindrical member 16' has a broad width portion 100', which extends outward in the radial direction, formed at one end that joins the inner surface of the circular portion of the diffuser shell. The broad width portion 100' is welded onto the inner surface of the circular portion of the above-mentioned diffuser shell. The central cylindrical member 16' can be formed by press work as with the central cylindrical member for the gas generator shown in FIG. 1. It can also be formed by casting or forging.

The central opening 15' engages with the outer circumference of the above-mentioned central cylindrical member 16'. The flange area 19' of the diffuser shell and the flange area 20' of the closure shell overlap. Laser welding 21' is provided, and the diffuser shell and the closure shell are joined to form the housing 3'. Incidentally, for members identical to those in shown in FIG. 1, the same legend is provided and the explanation is omitted.

Figure 4:
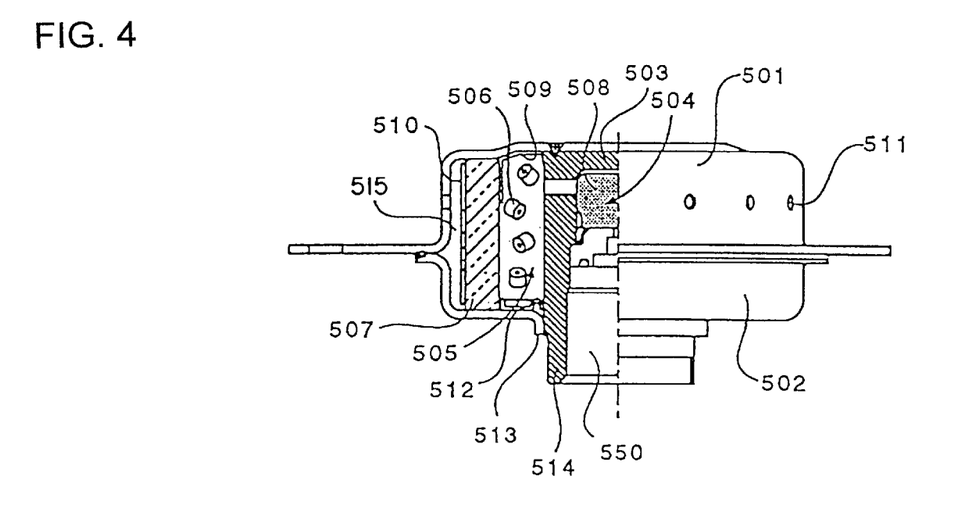
FIG. 4 is a partial cross-sectional view of yet another embodiment of the gas generator of the present invention.

FIG. 4 shows an embodiment of an air bag gas generator having an inner cylindrical member formed by casting.

For the gas generator shown in this Figure, a housing is formed by joining a diffuser shell 501, which has a plurality of discharge ports 511 in the circumferential direction, with a closure shell 502, which has a central opening 513. The two shells can be joined by various welding methods, for example, plasma welding, friction welding, projection welding, electron-beam welding, laser welding, TIG welding, etc. The inner cylindrical member 514 is formed by casting, and provided concentrically with the central opening 513 to partition inside the housing into two chambers (the inside of the inner cylindrical member 514; is for an igniter storage chamber 504, and the outside is for a combustion chamber 505). The inner cylindrical member 514 has, at one end joining the inner surface of the ceiling of the diffuser shell 501, a broad width portion 503, which extends inward and shaped to close the opening of this one end. By welding the broad width area 503 with the inner surface of the ceiling of the diffuser shell 501, the two become integrated, and the inner cylindrical member 514 provided in the housing partitions the inside of the housing into an igniting unit storage chamber 504 and a combustion chamber 505. The igniting unit, including a transfer charge 508 and a mechanical sensor 550, is contained in an igniting unit storage chamber 504, which was partitioned by the inner cylindrical member 514. The combustion chamber 505 contains gas generating agents 506, a coolant/filter 507, a coolant support member 509, a ring body 510, a plate member 512, and other suitable members for operating a gas generator. Incidentally, for this gas generator, it is also possible to use a suitable structure, such as a plenum 515 etc., which is obtained on the outer side of the coolant/filter 507, as needed.

As the igniting unit for igniting the gas generating agents 506 in the gas generator shown in FIG. 4, an igniting unit which fires a firing pin (not shown in the Figure) upon sensing an impact via an exclusively mechanical method, i.e., the mechanical ignition type, is used; but an electrical ignition type can also be used as the igniting unit.

Figure 5A:
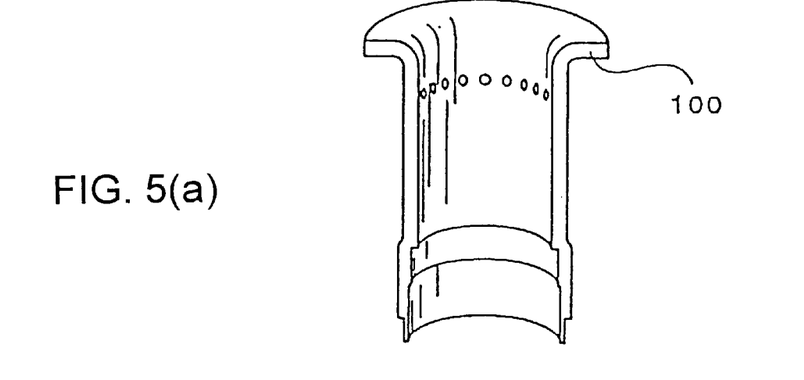
FIGS. 5(a)–5(c) are vertical diagonal views of the inner cylindrical members used in the gas generator of the present invention.
Figure 5B:
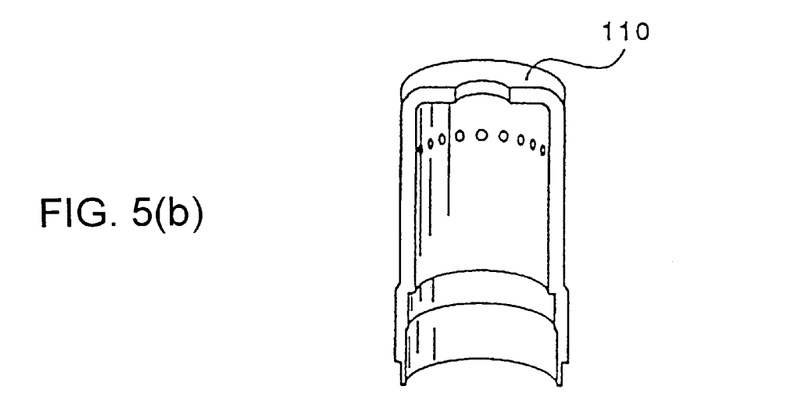
Figure 5C:
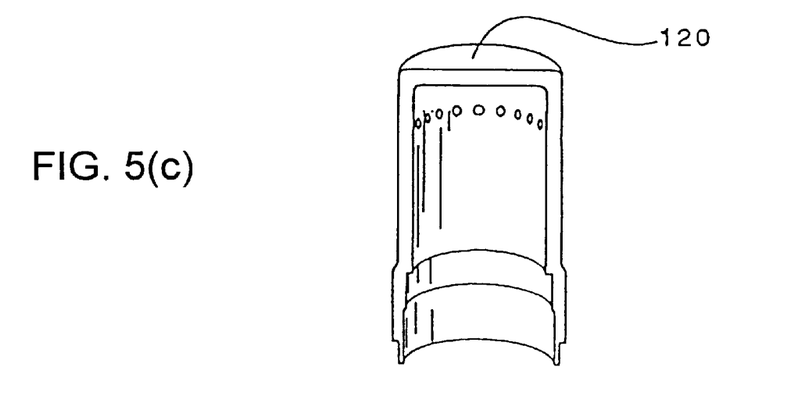

FIGS. 5(a)–(c) show examples of the inner cylindrical members used in the air bag gas generator of the present invention. As with the inner cylindrical member used in the gas generator shown in FIG. 1, the one shown in FIG. 5(a) has, at one end thereof, a broad width area 100 extending outwardly, that joins with the inner surface of the ceiling, while the one shown in FIG. 5(b) has, at one end thereof, a broad width area 110 extending inwardly, that joins with the inner surface of the ceiling. The inner cylindrical member shown in FIG. 5(c) has, at one end thereof, a broad width area 120, which extends inwardly in such a way as to close the opening at the end portion thereof, that joins the inner surface of the ceiling. The inner cylindrical members shown in these FIGS. 5(a)–(c) can be formed by either casting, forging, or press or cutting work, etc., or a combination of the above. Moreover, these inner cylindrical members are provided, on the circumferential walls thereof, with through-holes for ejecting the flame from the transfer charge, which is ignited and burns in the igniting unit storage chamber inside the inner cylindrical member. The through-holes can be closed off with a tape (not shown in the Figure) in order to prevent moisture, etc. Incidentally, it is possible to provide a depression at the area where the sealing tape is to be attached and then attach the tape inside the depression.

Figure 6:
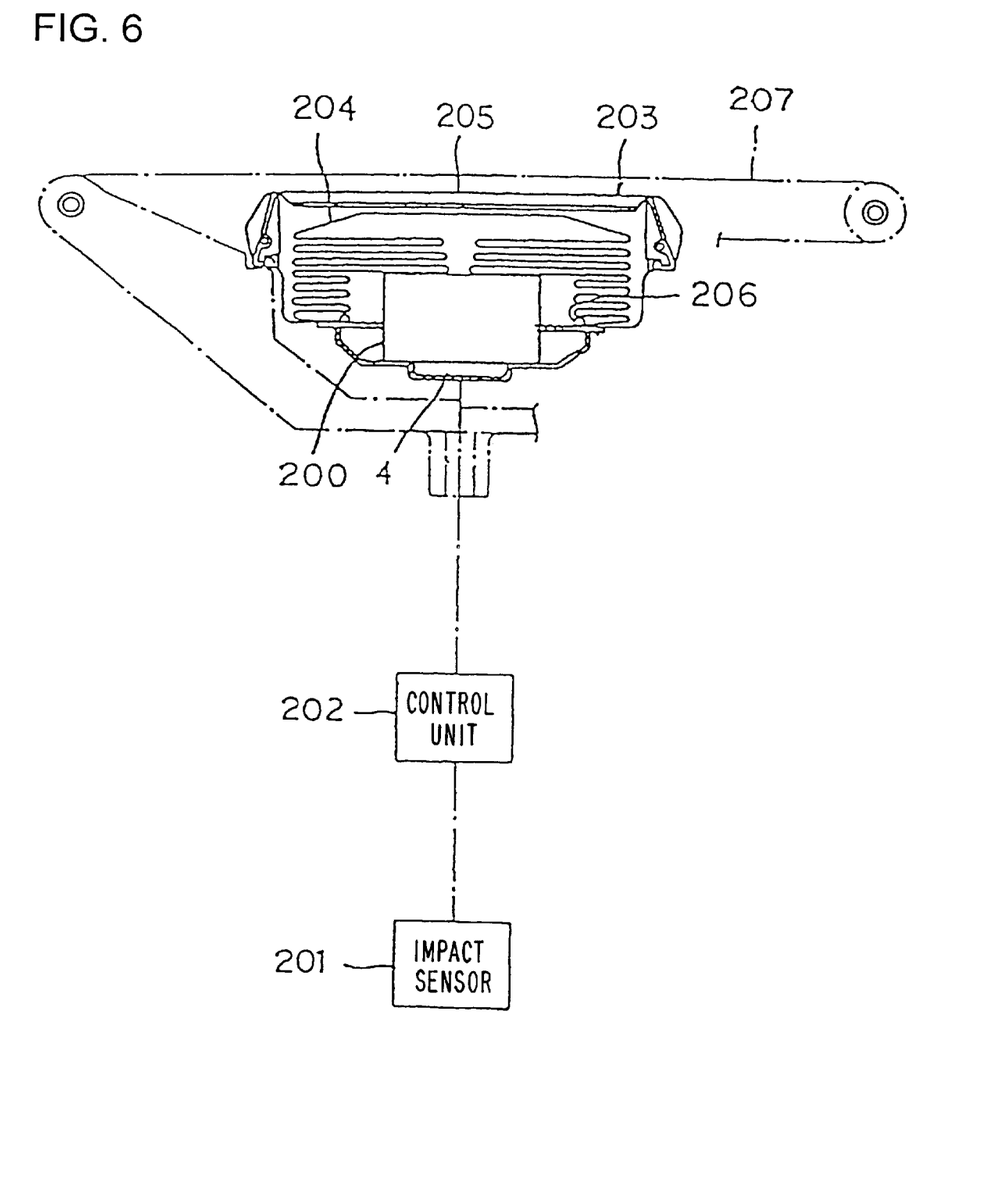
FIG. 6 is a configuration of an air bag system of the present invention.

FIG. 6 shows an embodiment of an air bag system of the present invention constituted to include a gas generator using the electrical ignition type igniting unit. This air bag system consists of a gas generator 200, an impact sensor 201, a control unit 202, module case 203, and an air bag 204.

The gas generator explained according to FIG. 1 is used as the gas generator 200.

The impact sensor 201 comprises, for instance, a semiconductor-type acceleration sensor. This semiconductor-type acceleration sensor has four semiconductor strain gauges formed on a silicon substrate beam, which is designed to deflect when acceleration occurs. These semiconductor strain gauges are bridge connected. When acceleration occurs, the beam is deflected, and the surface is strained. Because of this strain, the resistance of the semiconductor strain gauges changes, and this resistance change is detected as a voltage signal that is proportional to the acceleration.

The control unit 202 has an ignition evaluation circuit, and the signal from the above-mentioned semiconductor-type acceleration sensor is inputted to the ignition evaluation circuit. The control unit 202 begins its calculation at the point at which this impact signal exceeds a certain value. It outputs an activation signal to the igniter 4 of the gas generator 200 when the calculation result exceeds a certain value.

The module case 203, made of a polyurethane, for example, includes a module cover 205. The air bag 204 and gas generator 200 are installed inside the module case 203 to constitute a pad module. The pad module is attached to a steering wheel 207 of an automobile.

The air bag 204 is formed of nylon (nylon 66, for example) or polyester, etc. and secured to the flange area of the gas generator. The air bag opening 206 encloses the gas discharge ports of the gas generator while being folded.

When the semiconductor acceleration sensor 201 senses an impact at the time of an automobile collision, its signal is transmitted to the control unit 202, and the control unit 202 begins its calculation at the point at which the impact signal from the sensor exceeds a certain value. It outputs the activation signal to the igniter 4 of the gas generator 200 when the calculation result exceeds a certain value. Because of this, the igniter 4 is activated to ignite the gas generating agents, which then burn and generate a gas. This gas is ejected into the air bag 204, whereby the air bag breaks the module cover 205 and inflates, forming a cushion which absorbs an impact between the steering wheel 207 and a passenger.

The invention being thus described, it will be obvious that the same may be varied in many ways. Such variations are not to be regarded as a departure from the spirit and scope of the invention, and all such modifications as would be obvious to one skilled in the art are intended to e included within the scope of the following claims.

We claim:

1. An air bag gas generator, comprising:
   a housing; and
   an inner cylindrical member provided within said housing and defining two or more chambers within said housing, said inner cylindrical member having, at least at one end thereof, a flat surface extending outwardly with respect to a longitudinal axis of said inner cylindrical member, said flat surface being joined to an inner surface of said housing, wherein said inner cylindrical member is open at both ends thereof before joining to the inner surface of said housing and said flat surface is formed by bending one end of said inner cylindrical member outwardly.

2. The air bag gas generator of claim 1, wherein said inner cylindrical member is formed by a presswork.

3. The air bag gas generator of claim 1, wherein said inner cylindrical member is welded to the inner surface of said housing at said flat surface, using said flat surface as a welding area.

4. The air bag gas generator of claim 1, wherein said housing is formed by welding a diffuser shell having gas discharge ports with a closure shell having an igniting unit storage opening, and said inner cylindrical member is integrally welded onto an inner surface of said diffuser shell.

5. the air bag gas generator of claim 4, wherein said diffuser shell and said closure shell are formed by press-molding stainless steel sheets.

6. The gas generator of claim 1, wherein said inner cylindrical member defines an igniting unit storage chamber and a combustion chamber within said housing.

7. The air bag gas generator of claim 1, wherein said inner cylindrical member is formed by pressing a stainless steel material to form a cylinder and joined to the inner surface of said housing by welding.

8. An air bag system, comprising:
   a gas generator activated upon an impact, said gas generator having,
      a housing, and
      an inner cylindrical member provided within said housing and defining two or more chambers within said housing, said inner cylindrical member having, at least at one end, a flat surface extending outwardly with respect to a longitudinal axis of said inner cylindrical member, said flat surface being joined to an inner surface of said housing;
   an air bag inflated by introducing a gas generated by said gas generator; and
   a module case containing said air bag,
   wherein said inner cylindrical member is open at both ends thereof before joining to the inner surface of said housing and said flat surface is formed by bending one end of said inner cylindrical member outwardly.

9. The air bag system of claim 8, wherein said inner cylindrical member is formed by pressing a stainless steel material to form a cylinder and joined to the inner surface of said housing by welding.

10. An air bag gas generator, comprising:
    a housing having gas discharge ports;
    an inner cylindrical member having, at least at one end thereof, a flat surface extending outwardly with respect to a longitudinal axis of said inner cylindrical member, said flat surface being joined to an inner surface of said housing;
    a plate member having a circular portion provided with a central opening and a circumferential was formed at an outer edge of the circular portion, said plate member being positioned within said housing by fitting the central opening to one of said inner cylindrical member and an outer edge portion of said flat surface; and
    a cylindrical coolant member adapted to cool combustion gas generated by a gas generating agent disposed within said housing, said coolant member being positioned in said housing by fitting a circumferential surface of the coolant member to the circumferential wall of said plate member,
    wherein said inner cylindrical member is open at both ends thereof before joining to the inner surface of said housing and said flat surface is formed by bending one end of said inner cylindrical member outwardly.

11. The gas generator of claim 10, wherein said cylindrical coolant member catches residues contained in the combustion gas.

12. The gas generator of claim 10, wherein said inner cylindrical member defines an igniting unit storage chamber and a combustion chamber within said housing.

13. A method of welding an inner cylindrical member, provided within a housing of an air bag gas generator, to an inner surface of the housing, comprising:

providing the inner cylindrical member being open at both ends thereof and having, at one end portion thereof, a flat surface formed by bending the end portion of said cylindrical member outwardly with respect to a longitudinal axis of said inner cylindrical member;

placing said flat surface of said inner cylindrical member onto an inside surface of said housing; and welding said flat surface to the inside surface of said housing by projecting a welding beam towards said flat surface from the outside of said housing.

14. The method of claim 13, wherein said welding step includes welding said flat surface by an electron beam welding.

15. The method of claim 13, wherein said providing step includes a step of pressing a stainless steel material to form a cylinder.

* * * * *